Jan. 30, 1951 M. F. PACAS 2,539,589
POWER TAKE-OFF MECHANISM
Filed May 2, 1947 4 Sheets-Sheet 1
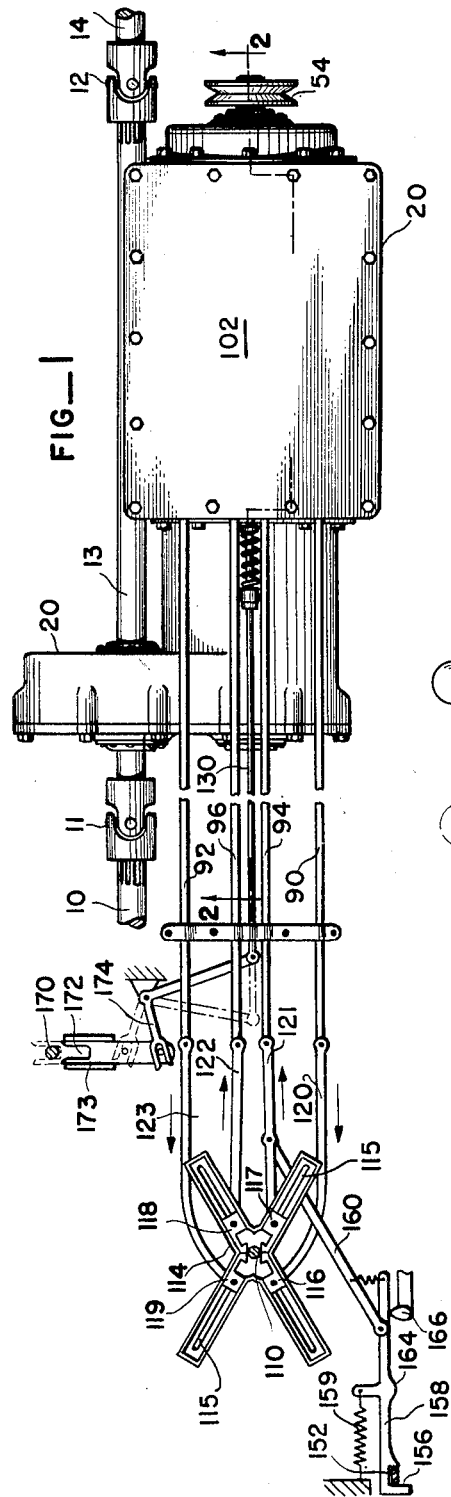
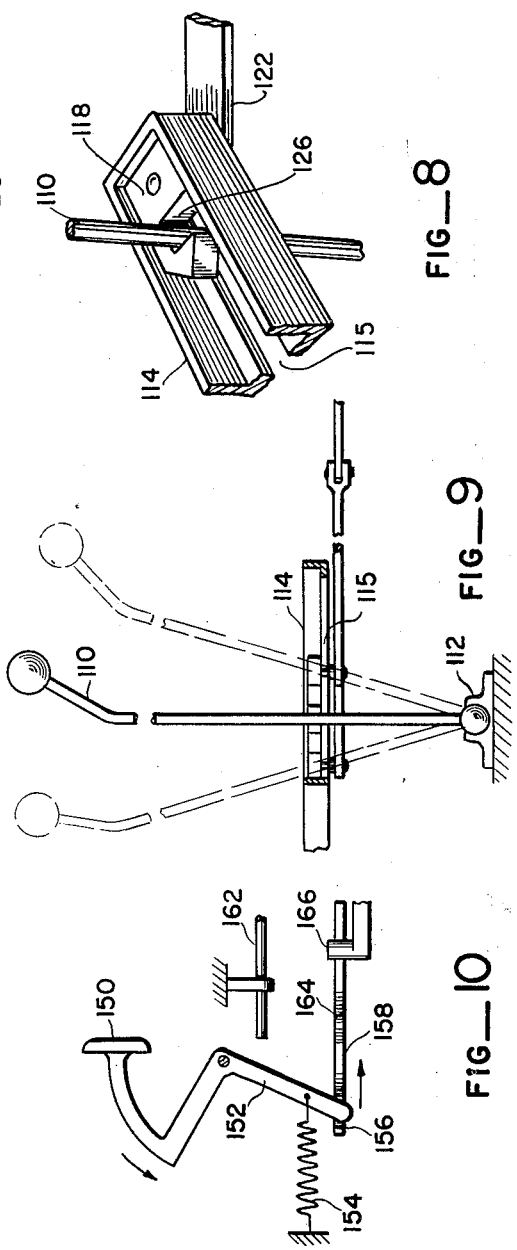
Manuel F. Pacas
INVENTOR.
BY Smith & Tuck
ATTORNEYS

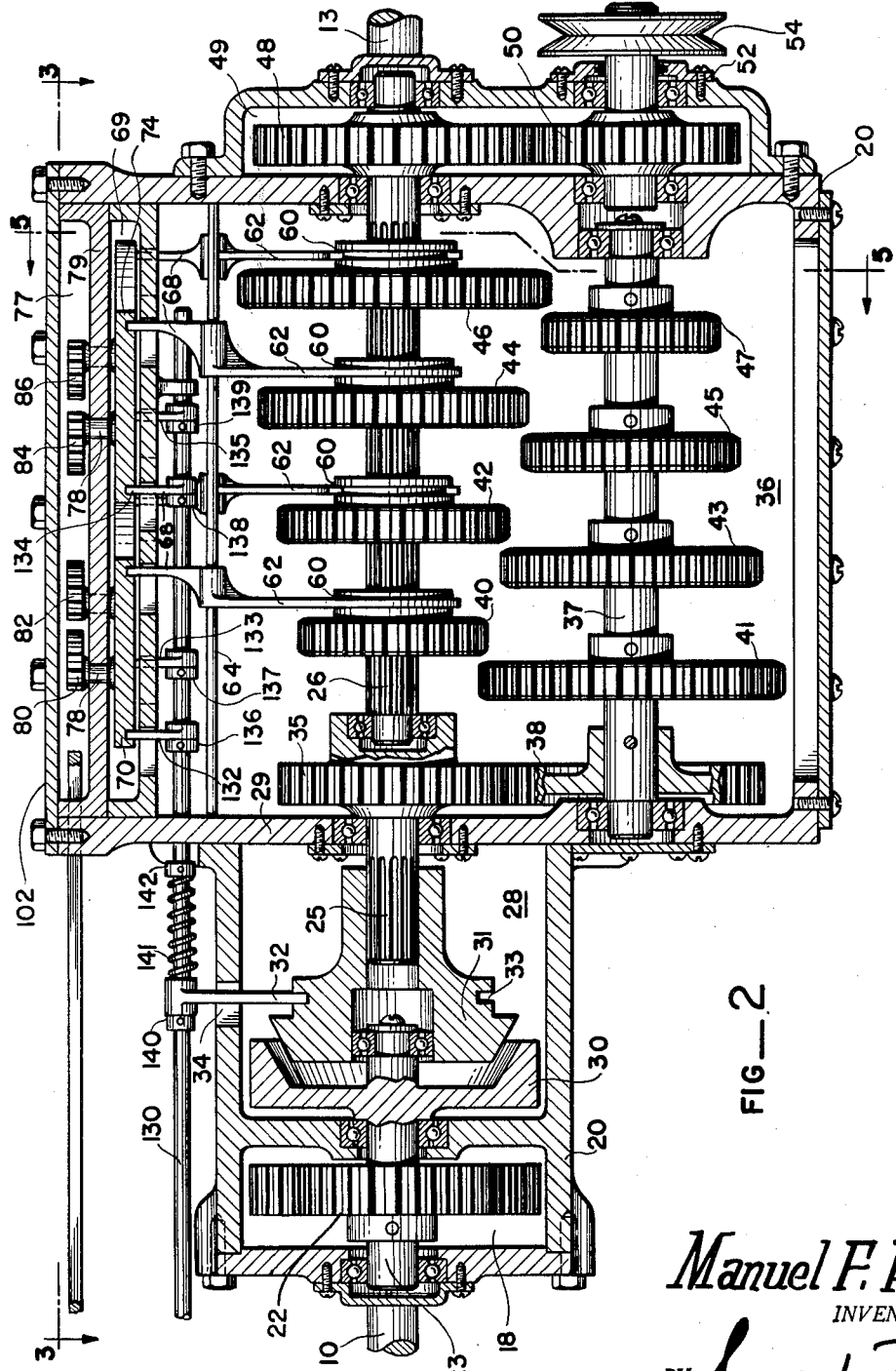

Jan. 30, 1951 M. F. PACAS 2,539,589
POWER TAKE-OFF MECHANISM
Filed May 2, 1947 4 Sheets-Sheet 3
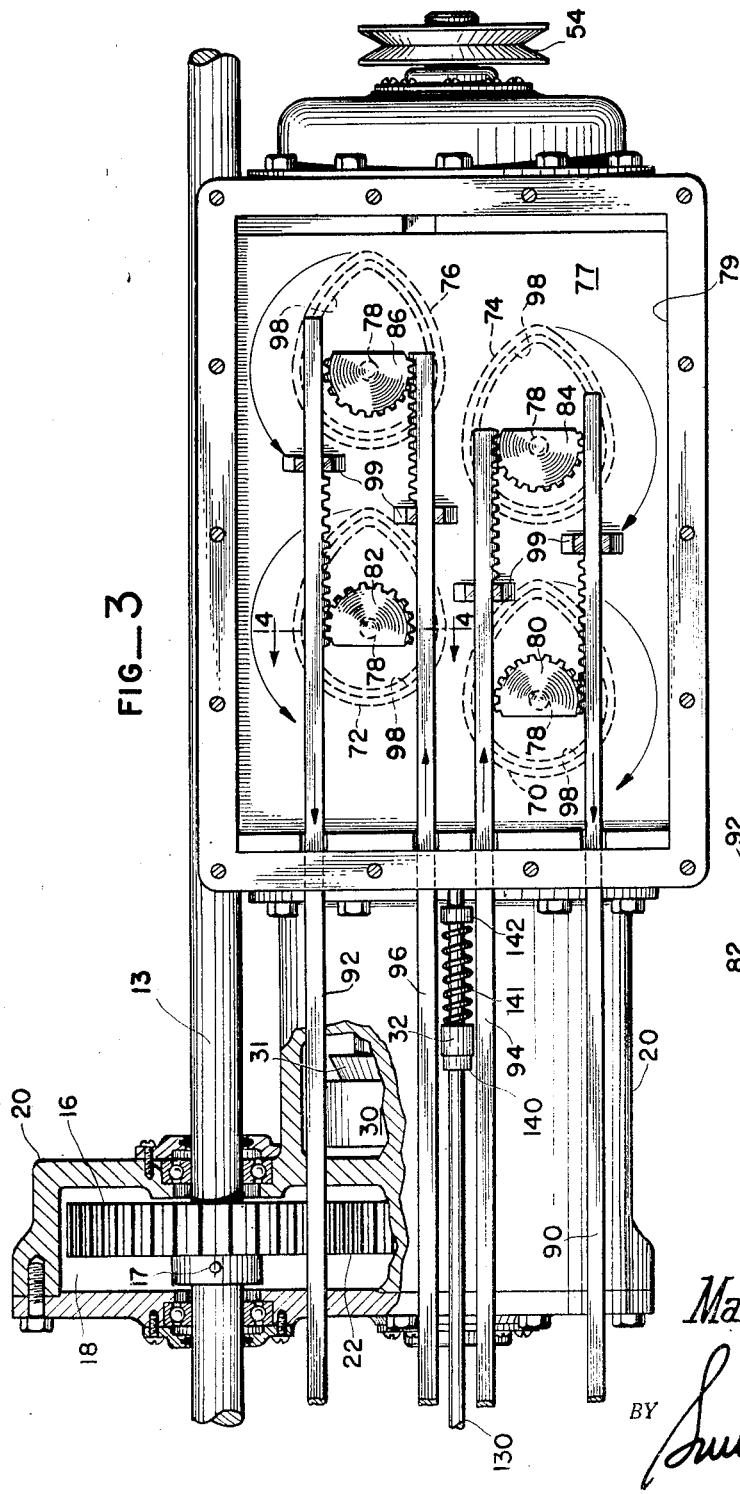
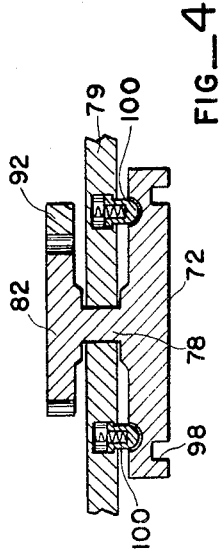
Manuel F. Pacas
INVENTOR.
BY Smith & Tuck
ATTORNEYS Jan. 30, 1951 M. F. PACAS 2,539,589
POWER TAKE-OFF MECHANISM
Filed May 2, 1947 4 Sheets-Sheet 4
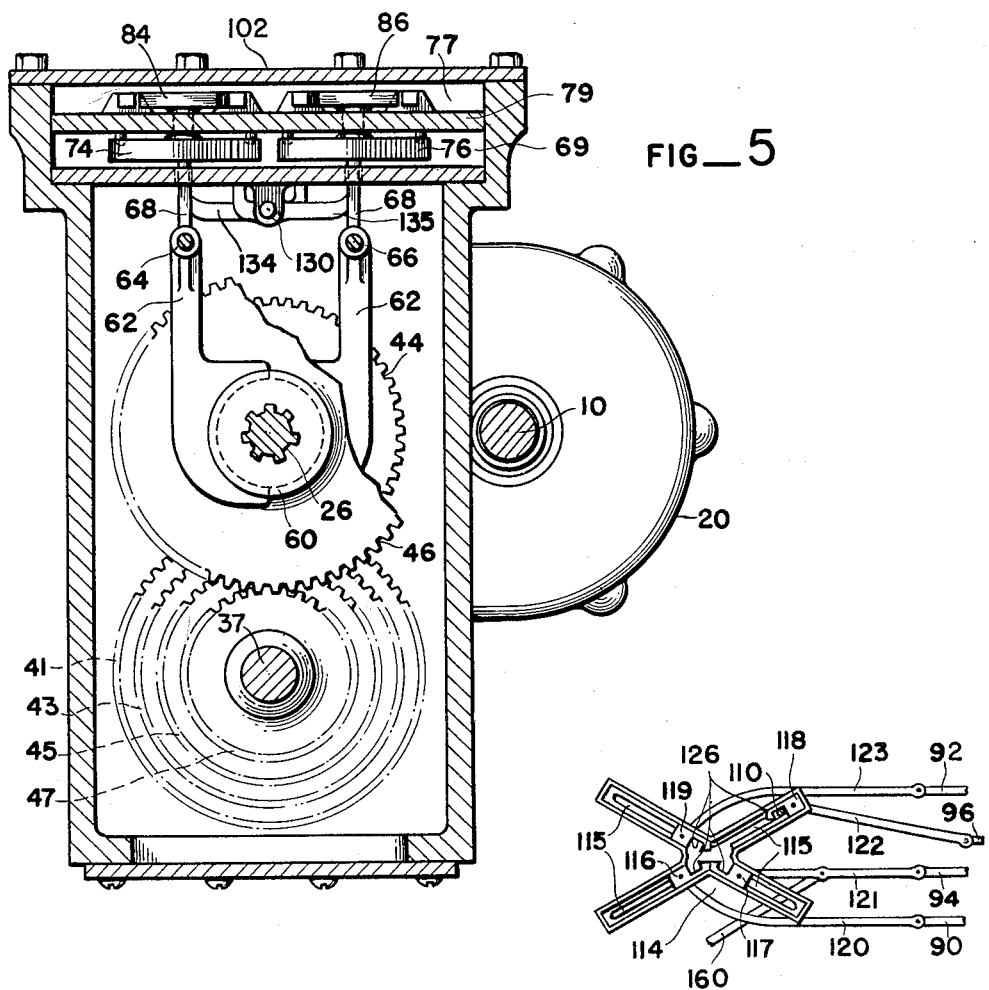
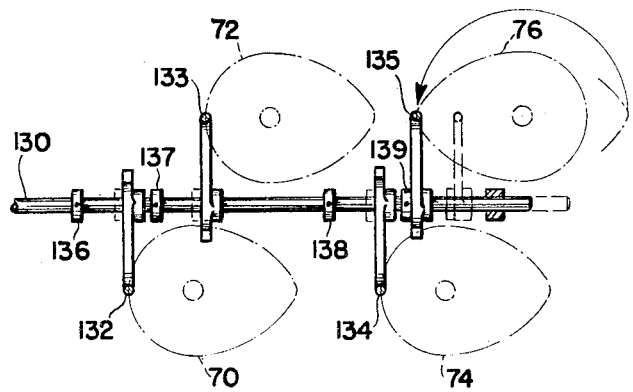
Manuel F. Pacas
INVENTOR.
BY Smith & Tuck
ATTORNEYS Patented Jan. 30, 1951

2,539,589

UNITED STATES PATENT OFFICE 2,539,589

POWER TAKE-OFF MECHANISM

Manuel F. Pacas, San Salvador, El Salvador

Application May 2, 1947, Serial No. 745,603

6 Claims. (Cl. 192—3.5)

This invention relates to a power take-off mechanism and, more particularly, to a novel mechanism of this type associated with an automotive vehicle to be employed to operate a power storing means at speeds in excess of or less than the engine speed, as well as to apply a braking action upon the vehicle under certain circumstances.

My arrangement is simple and compact in arrangement and construction and may be easily tied in with the usual elements of a vehicle in such a manner that the control means, which is normally placed convenient to the vehicle operator, can be employed with facility and accuracy to place the mechanism in operation either for the production of power or for braking effect, or for both.

An important feature of my invention relates to the employment of momentum of a vehicle, as it descends an incline, to apply rotation through a train of gears to a pump mechanism or to a generator for the production of power capable of being stored either in compressed air cells or in conventional storage batteries, while at the same time supplying a braking effect upon the vehicle, aside from that normally available by the usual friction devices employed.

In accordance with my invention, the usual vehicular engine may be uncoupled from the propeller shaft and the power take-off mechanism may be coupled in its place at one side to operate the pump or generator mentioned.

It is most desirable in some cases to insure that the disconnection of the engine from the propeller shaft be so maintained that it cannot be re-established without the operator first de-actuating the power take-off mechanism.

Another feature of the invention is to provide a mechanism that may either be employed automatically, the engine first being disconnected from the propeller shaft upon the partial application of the vehicle brakes, or which may be placed in operation manually, irrespective of the operation of the brakes.

One more feature of the mechanism is to be found in the manner in which I have arranged simply for the engagement and disengagement of certain gear and clutch elements, employed in the power take-off, in a sequential manner to prevent clashing and to eliminate noise. This is most desirable in the usual passenger vehicles for the comfort of the passengers, as well as to keep the mechanism within the skill of less experienced operators.

Still another novel feature of my invention is the inclusion of an arrangement whereby plural speeds may be obtained between a vehicle propeller shaft and a member being driven, depending upon the desire of the operator, one of which speeds may be selected easily and quickly through the manipulation of means normally familiar to the operator. The selector mechanism is preferably manually operated, and I have provided that it be such that only one speed may be employed at a time, and that that speed must first be abandoned before another speed can be employed, with a consequent saving due to the elimination of wear and tear on the parts of the power take-off and the prevention of accidental engagement of the mechanism in two speeds simultaneously.

These, and other features of the invention will be better understood upon reading the following specification, in view of the accompanying drawings, in which:

Fig. 1 is a plan view of my mechanism in the neutral position as it is associated with the conventional drive shaft of a vehicle;

Fig. 2 is a vertical longitudinal sectional view taken on line 2—2 of Fig. 1;

Fig. 3 is a plan view taken in the plane 3—3 of Fig. 2 and with portions of the gear case broken away for convenience of illustration;

Fig. 4 is an enlarged vertical sectional view taken through a gear segment and eccentric member on the line 4—4 of Fig. 3;

Fig. 5 is a vertical sectional view taken on line 5—5 of Fig. 2;

Fig. 6 is a schematic view of the eccentric group and rod shifter means associated therewith;

Fig. 7 is a plan view of the rack shifter mechanism as it appears at a selected moment of operation;

Fig. 8 is an enlarged perspective view showing a detail of the rack shifter of Fig. 7;

Fig. 9 is a view in elevation of the lever that is employed to operate the rack shifter mechanism; and Fig. 10 is a schematic view showing a detail of an alternative means employed to shift a pair of gears into mesh.

My mechanism is associated with the main propeller shaft 10 which extends between the conventional engine transmission and differential of an automotive vehicle. For flexibility I have interposed in shaft 10 the universal couplings 11 and 12, between which is the intermediate portion 13. The rear shaft section 14 is coupled between universal joint 12 into the differential gear train.

Gear 16 is secured to shaft portion 13 by pin 17 and is suitably journalled within the gear case 20 in chamber 18 which extends laterally to one side of the axis of shaft 10. Gear 22 which is rigid with shaft 23 meshes with gears 16 and establishes the line of shaft 25 and countershaft 26. Shaft 26 is freely journalled in the end of shaft 25.

Within chamber 28 of case 20 is a clutch whereby shafts 23 and 25 are coupled. The clutch comprises cup 30 and cone 31, which latter element is slidably coupled to shaft 25 by grooves and the splines therebetween. A shifter fork 32 engages in groove 33 of cone member 31, and its shank extends upward through opening 34 in a wall of chamber 28. Shaft 25 extends through the wall 29 between chambers 28 and 36 in which latter chamber is positioned gear 35. Shaft 26 within chamber 36 of gear case 20 is rotatable independently of shaft 25 and has mounted thereon shiftable gears 40, 42, 44 and 46, which are of various sizes as shown in Fig. 2.

Driven shaft 37 is suitably journalled in the chamber 36 parallel to shaft 26 and has gear 38 pinned thereto in constant mesh with gear 35. Gears 41, 43, 45 and 47 are also secured to driven shaft 37, normally out of mesh with the gears of group 40, 42, 44 and 46. Shifting one of the latter into mesh with the appropriate gear of group 41, 43, 45, or 47 will result in rotation of shaft 26 should power then be applied to driven shaft 37. In such case, gear 48 in chamber 49 on shaft 26 will drive gear 50 on idler shaft 52 which carries the sheave 54 external of casing 20.

From the foregoing it will be seen that, when the propeller shaft 10 is turning and the elements 30 and 31 of the clutch between shafts 23 and 25 are in engagement, rotative power will be applied to driven shaft 37 and may be applied to shaft 26 in either reduced or elevated speed, in accordance with the meshing of any of the pairs of gears 40—41, 42—43, 44—45, or 46—47, as dictated by the desire of the operator when translated through the instrumentality of certain setting or selecting mechanism, to be described later.

The shifting of gears 40, 42, 44 and 46 is obtained by providing each with a groove 60 to receive a shifter 62. The shifter forks of gears 40 and 44 are slidably mounted on guide rod 64 and, similarly, the forks of gears 42 and 46 are mounted on rod 66. Rods 64 and 66 are supported at their ends in walls of chamber 36. Each shifter fork 62 has an upstanding horn 68.

In chamber 69 which is superposed above chamber 36 is mounted a plurality of egg-shaped eccentric members 70, 72, 74 and 76, each having an upstanding shaft 78 journalled in wall 79 and rising into chamber 77 that overlies chamber 69. Member 70 is coupled by shaft 78 to gear segment 80. In like manner, eccentrics 72, 74 and 76 are coupled to pinion segments 82, 84 and 86 respectively. Each pinion segment is engaged with a longitudinally slidable rack as shown in Fig. 3, in the following order: pinion 80 to rack 90, pinion 82 to rack 92, pinion 84 to rack 94, and pinion 86 to rack 96. Longitudinal movement of a rack accomplishes a turning motion of the associated gear segment and a corresponding turning motion of the eccentric member therebelow. Since each eccentric member has a groove 98 in its lower face, in which is positioned a horn 68 of one of the shifter forks 62, revolution of the eccentric groove will provide reciprocal motion of the shifter fork and consequent engagement or disengagement of a gear on shaft 26 with its mating gear on driven shaft 37.

The racks 90—96 are mounted in guides 99, which are aligned with the openings in the forward wall of chamber 77 and extend forward of the gear case. Between each eccentric member and wall 79 there are one or more spring-pressed detent assemblies 100, which serve to maintain the eccentric member in a desired position, whereby it may not vibrate out of alignment during periods of non-use. The chamber 77 is closed by cover plate 102 secured thereon.

Shifting of the rack bars is accomplished at a point convenient to the operator. In the case of an automobile or truck, a lever 110 is pivotally mounted in an upright position in the ball-and-socket element 112, so that its intermediate portion extends through the crossing of the slotted X-shaped guide 114. Member 114 has slots 115 in its arms. The arms of member 114 are also channeled and each has slidable therein a slider such as 116, 117, 118, and 119, which are connected to racks 90, 94, 96, and 92, respectively, by links 120, 121, 122, and 123, respectively. The four sliders are normally positioned at the crossing of member 114 with the notches 126 so grouped and opened that an operator may selectively introduce the lever 110 into any one of the sliders and, in accordance with his choice and the direction in which he moves the lever 110, he will impart a push upon a rack and a consequent rotation of one of the eccentrics.

As an example, let us assume that the lever 110 has been introduced into the notch of slider 118 as shown in Fig. 7, and the slider has been caused to move out along the channel of its guideway arm of the X-shaped member 114. Pressure is applied to link 122, thence to rack 96 to cause gear segment to revolve and turn eccentric 76. Such action results in an application of pressure upon the horn 68 or fork 62 associated with gear 46 to move the fork and gear forwardly into mesh with gear 47. When the clutch 30, 31, is engaged, rotative motion will be applied through driven shaft 37 to shaft 26 in a slightly reduced ratio and, of course, sheave 54 will be caused to rotate. A return of the lever 110 to the central position disengages the gears 46, 47. Such action is possible with any one of the pairs of gears in chamber 36 by proper manipulation of the lever 110.

A slide rod 130 is suitably mounted in the gear case and slidably supports a plurality of upright pins 132, 133, 134, and 135, which are, respectively, inserted into the grooves of eccentrics 70, 72, 74, and 76. Thus, when one of the eccentrics is turned, a forward motion is imparted to rod 130 when the concentric portion of the groove on the underside of the eccentric has moved so that the eccentric portion of the groove is urging the pin forward. Such is illustrated in Fig. 6, wherein the eccentric 76 has been revolved through an arc of 180° causing pin 135, which is slidably mounted on rod 130, to press against the collar 139 which is secured to the rod.

The clutch shifter fork 32 is also slidably associated with rod 130 between collar 140 and spring 141, which is seated against collar 142. By such means, forward movement of the rod 130 results in closing of the clutch 30, 31, in timed sequence following the meshing of one of the pairs of gears in chamber 36.

If the vehicle is going to descend a hill the vehicle operator may wish to utilize the potential energy of the vehicle. If the sheave 54 is connected to some means of storing power and the power take-off mechanism is placed in operation during the descent, the potential energy is transferred to the means of storing power for future utilization. When the power take-off mechanism is in operation there is some added resistance to the movement of the vehicle due to friction between the parts of the power take-off mechanism and the drag of the means of storing power on sheave 54. This resistance of course, tends to decrease the speed of the car during descent. The resistance can be varied somewhat by the choice of gears in the mechanism that are meshed as the means of storing power usually would offer more resistance if the speed of the sheave 54 is increased.

An alternate means of meshing gears 44 and 45 without manipulating the lever 110 is provided by means of the brake pedal 150. This alternative is more convenient than using the lever 110 if the brake may be needed to further resist the movement of the vehicle as in descending a steep hill. As will be seen from the following description, a slight depression of the brake pedal 150 will connect the power take-off mechanism and a further depression will disconnect the power take-off mechanism and operate the brake of the vehicle. This is accomplished by depressing the brake pedal 150 to cause the bell crank 152 to swing counter clockwise, as shown in Fig. 10, against the pull of spring 154. The lower arm of the bell-crank is positioned in notch 156 of presser bar 158. Link 160 connects bar 158 with link 121 of rack 94. As a medium pressure is applied to pedal 150, first the gears are meshed in the normal manner, but as the pressure is increased more fully the brakes are applied by the bell-crank pressing against the brake-rod 162, which operates the vehicle's brakes in the conventional manner. At about the same moment that the brakes are being further depressed the hump 164 on bar 158 contacts the cam 166, which causes the bar 158 to be displaced sideways, whereupon the notched end of bar 158 is disassociated from bell-crank 152 and the bar is returned under the urgence of spring 159. In such event, the clutch will open and the gears 44, 45 will be unmeshed to remove power from sheave 54.

The usual gear shift lever for the normal transmission mechanism of a vehicle is indicated at 170 in Fig. 1. I provide a locking mechanism comprising the fork 172 slidable in guideway 173 and movable through the instrumentality of bell-crank 174 which is coupled to rod 130. When rod 130 moves forward the fork 172 moves out to engage lever 170 when it is in the neutral position. This prevents inadvertent shifting into gear, the conventional transmission while the power take-off is in operating condition and constitutes a safety device in the vehicle.

Throughout the drawings frictionless bearings have been shown for the various shafts that rotate. The casing may be adapted variously for assembly and disassembly and, of course, lubricant seals may be employed, all according to usual practices.

While I have shown and described particular embodiments of my invention, it will occur to those skilled in the art that various changes and modifications may be made without departing from the invention, and I therefore aim in the appended claims to cover all such changes and modifications as fall within the true spirit and scope of my invention.

Having thus described my invention, I claim:

1. A power take-off mechanism for automotive vehicles, of the type having a propeller shaft; a driven shaft; a gear couple and a normally disengaged clutch between said propeller shaft and said driven shaft; said mechanism, comprising: a countershaft; a normally disengaged gear couple between said countershaft and said driven shaft, said gear couple being engageable by movement of one gear in an axis parallel to the axis of the other gear; a revoluble eccentric member; shifter means associated with said gear to be moved and with said eccentric member and operable upon revolution of said eccentric member; clutch operating means associated between said eccentric member and said clutch and operable by movement of said eccentric following engagement of said gears; rack and pinion means for revolving said eccentric member whereby said gears are first engaged and then said clutch is engaged; and manually operable means for reciprocating said rack means.

2. A power take-off mechanism for automotive vehicles, of the type having a propeller shaft; a driven shaft; a gear couple and a normally disengaged clutch between said propeller shaft and said driven shaft; said mechanism, comprising: a countershaft; a normally disengaged gear couple between said countershaft and said driven shaft, said gear couple being engageable by movement of one gear in an axis parallel to the axis of the other gear; a revoluble member having a compound arcuate groove therein including a portion concentric and a portion eccentric with the axis of rotation of said revoluble member; shifter means associated with said gear to be moved and with the eccentric portion of said groove of the revoluble member; clutch operating means associated with said concentric portion of the groove and with said clutch; and means for revolving said revoluble member whereby said gears are first engaged and then said clutch is engaged.

3. A power take-off mechanism for automotive vehicles, of the type having a propeller shaft; a driven shaft; a gear couple and a normally disengaged clutch between said propeller shaft and said driven shaft; said mechanism, comprising: a countershaft; a plurality of normally disengaged gear couples between said countershaft and said driven shaft, said gear couples being of different ratios and each being engageable upon movement of one gear in an axis parallel to the axis of the corresponding gear; a revoluble eccentric member for each said plurality of gear couples; shifter means associated with each revoluble member and with the gear to be moved of the related gear couple and operable upon revolution of said eccentric member; clutch operating means associated with all said eccentric members and said clutch; and means for revolving selectively a chosen eccentric member whereby the gears related thereto are first engaged and then said clutch is engaged.

4. A power take-off mechanism for automotive vehicles, of the type having a propeller shaft; a driven shaft; a gear couple and a normally disengaged clutch between said propeller shaft and said driven shaft; said mechanism, comprising: a countershaft; a plurality of normally disengaged gear couples between said countershaft and said driven shaft, said gear couples being of different ratios and each being engageable upon movement of one gear in an axis parallel to the axis of the corresponding gear; a revoluble eccentric member for each normally disengaged gear couple; shifter means associated with each revoluble member and with the gear to be moved of the related gear couple and operable upon revolution of said eccentric member; clutch operating means associated with all said eccentric members and said clutch; and means for revolving selectively a chosen eccentric member whereby the gears related thereto are first engaged and then said clutch is engaged, said eccentric revolving means including an X-shaped guide member, a slider associated with each arm of said X-shaped member, a pivoted arm to selectively reciprocate one of said sliders, and rack and pinion means between each slider and an eccentric member and operable to revolve the latter upon movement of the slider.

5. A power take-off mechanism for automotive vehicles, of the type having a propeller shaft; a driven shaft; a gear couple and a normally disengaged clutch between said propeller shaft and said driven shaft; said mechanism, comprising: a countershaft; a normally disengaged gear couple between said countershaft and said driven shaft; said gear couple being engageable upon movement of one gear in an axis parallel to the axis of the other gear; a revoluble eccentric member; shifter means associated with said revoluble member and with the gear to be moved of the gear couple and operable upon revolution of said eccentric member; clutch operating means associated with said eccentric member and said clutch; and means for revolving said eccentric member whereby the gears related thereto are first engaged and then said clutch is engaged, said eccentric revolving means including a guideway, a slider associated with and movable relative said guideway, a pivoted lever to reciprocate said slider, and rack and pinion means between said slider and revoluble eccentric.

6. A power take-off mechanism for automotive vehicles, of the type having a propeller shaft; a driven shaft; a gear couple and a normally disengaged clutch between said propeller shaft and said driven shaft; said mechanism, comprising: a countershaft; a normally disengaged gear couple between said countershaft and said driven shaft, said gear couple being engageable upon movement of one gear in an axis parallel to the axis of the other gear; a revoluble eccentric member; shifter means associated with said revoluble member and with the gear to be moved operable upon revolution of said eccentric member; clutch operating means associated with said eccentric member and said clutch; and means for revolving said eccentric member whereby the gears related thereto are first engaged and then said clutch is engaged; said eccentric revolving means including a rack and pinion associated with the eccentric, a foot pedal coupled to said rack and means for disengaging said pedal and rack following a predetermined movement of said rack.

MANUEL F. PACAS.

REFERENCES CITED

The following references are of record in the file of this patent:

UNITED STATES PATENTS

| Number | Name | Date |
|---|---|---|
| 1,877,297 | Goldberg | Sept. 13, 1932 |
| 1,887,355 | Kranick | Nov. 8, 1932 |
| 2,062,523 | Miller et al. | Dec. 1, 1936 |
| 2,243,321 | Smith | May 27, 1941 |

FOREIGN PATENTS

| Number | Country | Date |
|---|---|---|
| 207,495 | Great Britain | June 25, 1923 |